United States Patent [19]

Phillipson

[11] Patent Number: 4,610,346

[45] Date of Patent: Sep. 9, 1986

[54] DEVICES FOR SEPARATING CONTIGUOUS ARTICLES

[75] Inventor: John G. Phillipson, Peterborough, England

[73] Assignee: Baker Perkins Holdings PLC, Cambridgeshire, England

[21] Appl. No.: 608,877

[22] Filed: May 10, 1984

[30] Foreign Application Priority Data

May 17, 1983 [GB] United Kingdom ................. 8313543

[51] Int. Cl.$^4$ ....................... B65G 47/26; B65G 59/00
[52] U.S. Cl. .................................... 198/425; 414/330; 198/368; 198/451; 198/740
[58] Field of Search ................ 198/425, 719, 368, 451, 198/740, 491, 492, 530, 532; 414/330; 221/298, 243; 271/140

[56] References Cited

U.S. PATENT DOCUMENTS

| | | | |
|---|---|---|---|
| 2,219,809 | 10/1940 | Davis | 198/425 |
| 2,937,788 | 5/1960 | Darsie | 198/530 |
| 3,127,029 | 3/1964 | Luginbuhl | 198/425 |
| 3,690,430 | 9/1972 | Moreland | 221/298 |
| 3,747,739 | 7/1973 | Fuchs et al. | 198/425 |
| 3,811,549 | 5/1974 | Preisig | 198/425 |
| 3,917,053 | 11/1975 | Matsuyama | 198/719 |
| 4,038,909 | 8/1977 | Preisig | 198/425 |
| 4,044,526 | 8/1977 | Lafleur | 198/425 |

Primary Examiner—Joseph E. Valenza
Assistant Examiner—Daniel R. Alexander
Attorney, Agent, or Firm—Steele, Gould & Fried

[57] ABSTRACT

Apparatus for handling biscuits comprises a pair of identical devices for separating and holding back advanced supplies of the biscuits, which are arranged in rows, in contiguous, upright relationship, within laterally-spaced supply channels. The rows of biscuits are converted into a single row by a chute which is periodically movable sideways, to a position at the outlet end of one of the channels while the biscuit supply in the other channel is held back by a separating member comprising a "finger" movable towards and upwardly away from the path of the advanced supply of biscuits by a piston and cylinder assembly operable so that, only upward movement of a separating member takes place as positive motion, whereas the downward movement of the member is such that it is free, pausing in its movement if necessary, to make entry into the supply in a yieldable manner.

9 Claims, 6 Drawing Figures

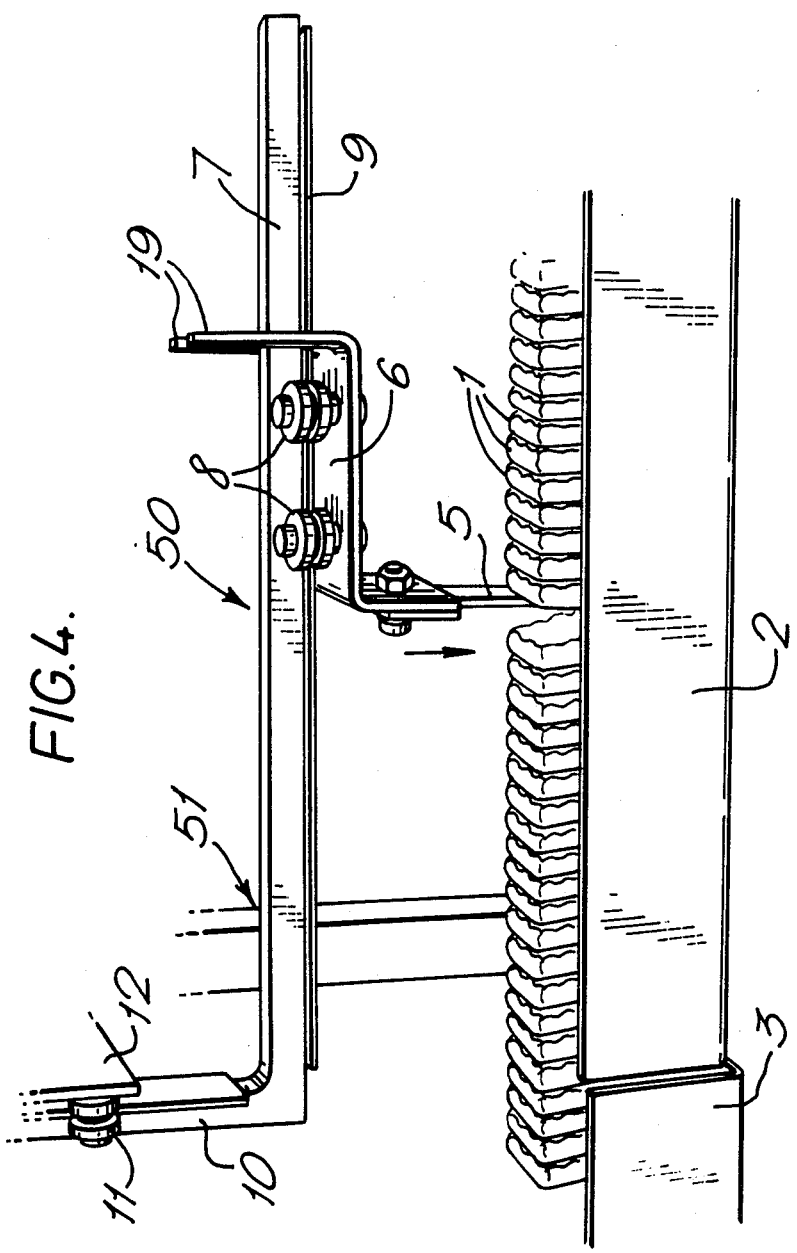

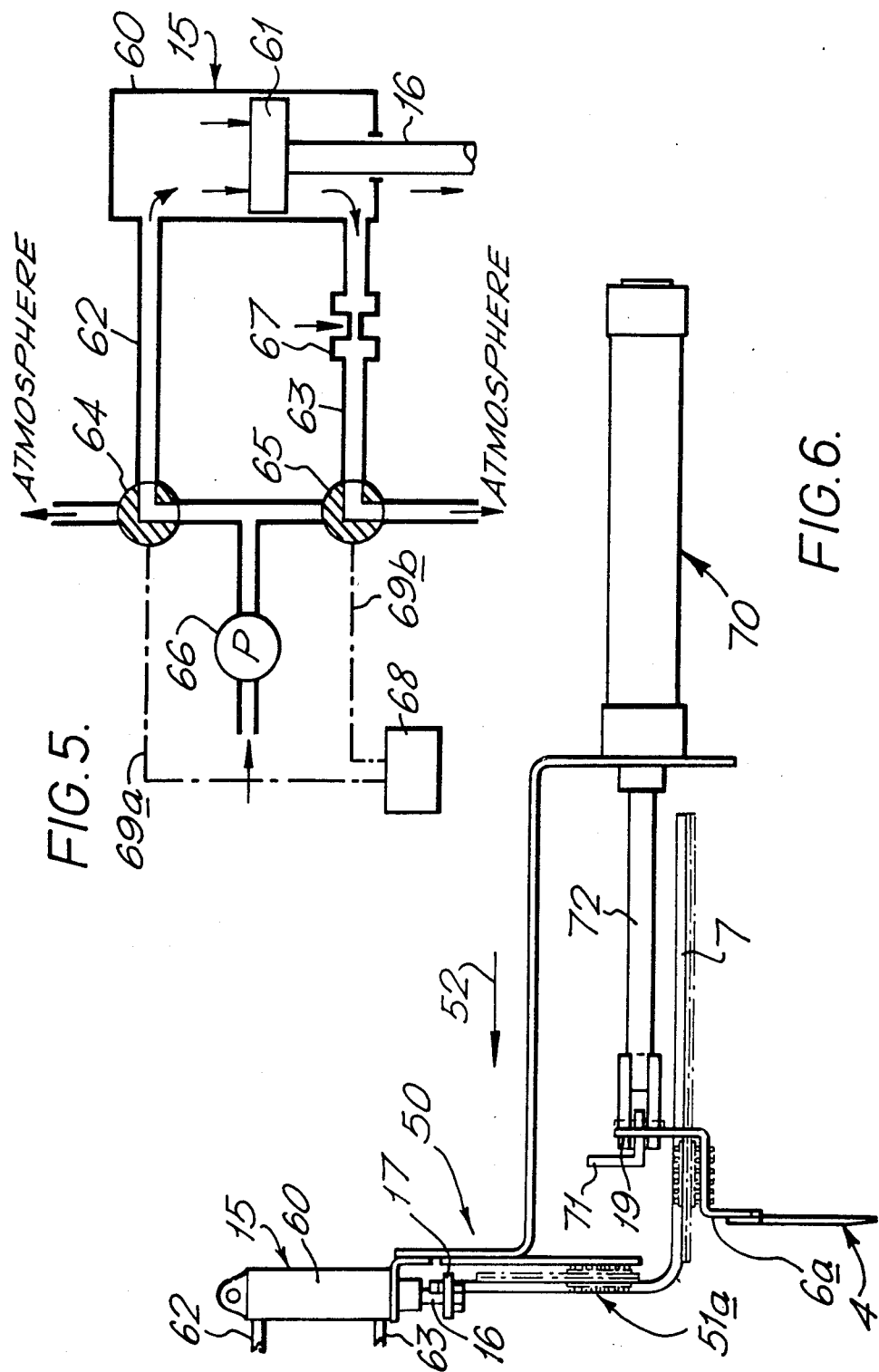

DEVICES FOR SEPARATING CONTIGUOUS ARTICLES

BACKGROUND TO THE INVENTION

This invention relates to devices for separating contiguous articles, more particularly upright laminar articles, such as biscuits being conveyed during processing. It should be understood that in the United Kingdom the term "biscuits" connotes a structure more akin to "crackers" or certain kinds "cookies" as the latter terms are commonly used in the United States.

The invention may be used to periodically hold back the supply of contiguous biscuits being conveyed during the processing thereof, by employment of a movable separating member capable of being inserted between immediate adjacent biscuits.

Co-pending U.K. patent application No. 83.31261, (U.S. Pat. application Ser. No. 556,691 of John G. Phillipson, filed Nov. 30, 1983 corresponds), describes apparatus for handling a plurality of streams of laminar articles so as to form a lesser number of streams. The first-mentioned streams are periodically required to be arrested from proceeding along a conveying path, and the device of the present invention may ideally be used with the apparatus.

Biscuits are relatively fragile articles and it is extremely difficult for a separating member to be inserted into a supply of biscuits without causing breakage of those biscuits adjacent the entry point of the separating member.

Known separating devices make use of separating members which are positively, i.e. forcefully, moveable downwardly towards and upwardly away from the path of an advanced supply. Thus, if the separating member contacts the top edge of a biscuit rather than finding its way between two immediately adjacent biscuits, it causes damage by shearing through the contacted biscuit and breaking it up.

Such damage is unacceptable for several reasons, not least because the broken portions of biscuits can jam machinery. It is therefore an object of this invention to provide a separating device using a separating member which will locate itself in a supply of biscuits without causing damage, even if the separating member initially comes into contact with the top edge of a biscuit.

It is a further object of the invention to provide such a device which will also hold back an advanced supply of the biscuits.

SUMMARY OF THE INVENTION

According to the present invention, a device for separating and holding back an advanced supply of contiguous laminar articles arranged in upright relationship, comprises a separating member movable downwardly towards and upwardly away from the path of the advanced supply, characterised in that means are provided whereby in operation, only upward movement of the separating member takes place as positive motion, whereas the downward movement of the separating member is such that it is free to make entry into the supply in a yieldable manner.

Downward movement of the separating member may take place under gravity.

The invention also resides in a device for separating and holding back an advanced supply of contiguous laminar articles arranged in upright relationship, comprising a separating member movable downwardly towards and upwardly away from the path of the advanced supply, and means whereby upward movement takes place under the influence of a relatively major force whereas downward movement takes place under the influence of a relatively minor force, so that on downward movement of the separating member it can make entry into the supply in a yieldable manner.

The relatively minor force may comprise gravity.

The separating member may, in addition to being movable towards and away from the path of the advanced supply, also be movable back and forth for a predetermined distance above and along said path, means being provided whereby the separating member, during movement above and in the direction of the advanced supply, also moves downward to make entry into the supply in a yieldable manner, whereby it is in an article-separating position by the time it reaches the end of its said movement in the direction of the advancing supply.

To repeat the article-separating sequence, means are provided whereby the separating member can be lifted from its separating position and moved back along and above the path of the advanced supply, ready to commence moving forward to make another entry into the supply.

The invention may be used for batching biscuits for the purpose of obtaining slugs thereof for feeding to a biscuit-wrapping machine. In this application of the invention, the separating member may, or may not, be movable above and along the path of the advanced supply.

BRIEF DESCRIPTION OF THE DRAWINGS

An embodiment of the invention will now be described, by way of example only, with reference to the accompanying, generally diagrammatic, drawings, wherein:

FIG. 4 is a view similar to that provided by FIG. 3, and illustrates the separating member about half-way through the biscuit separating movement, FIG. 5 is a semi-diagrammatic illustration of a piston and cylinder assembly 15 (FIG. 1) and associated control components, and FIG. 6 is a side view of a modification.

Some components have been omitted from some of the Figures, for reasons of clarity.

DETAILED DESCRIPTION OF THE PREFERRED EMBODIMENT

Figure 1:
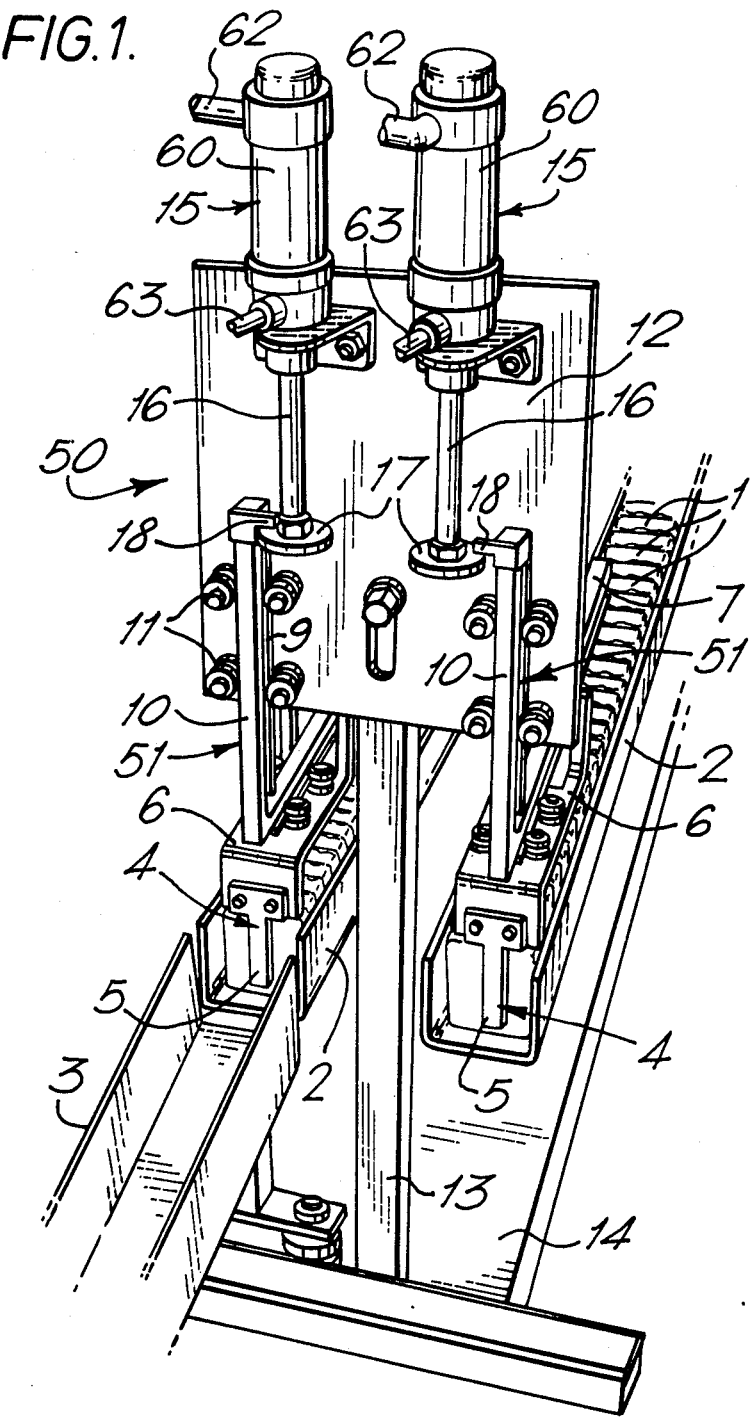
FIG. 1 is a view from the front and above, of a pair of devices for separating contiguous biscuits.

With reference first to FIG. 1, apparatus 50 for handling biscuits comprises a pair of identical devices 51 for separating and holding back advanced supplies of the biscuits 1, which are arranged in contiguous, upright relationship, within laterally-spaced supply channels 2. The biscuits 1 are fed into the channels 2 by conventional means not shown.

Only two channels 2 are shown. In practice, ten or more can be provided.

The two rows or streams of biscuits 1 are converted into a single row by a chute 3 which is periodically movable sideways (by actuating means, not shown), to a position at the outlet end of one of the channels 2 while the biscuit supply in the other channel 2 is held back by a separating member 4 of the associated device 51. The separating member 4 also serves as a biscuit supply stop.

Figure 2:
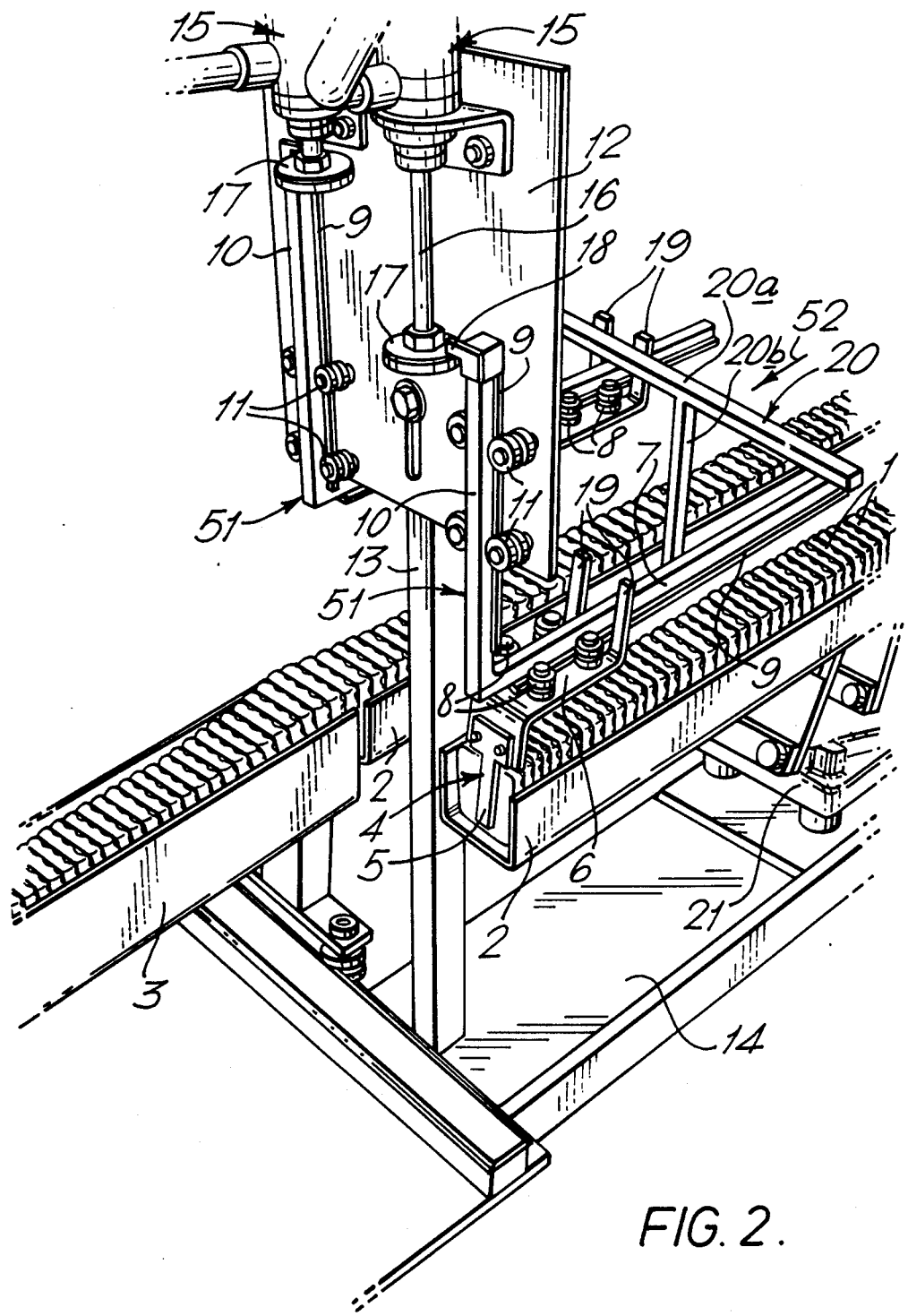
FIG. 2 is a view from the side and above, of the devices.

As best seen from FIG. 2, the stop/separating member 4 of each separating device 51 comprises an elongate "finger" 5 mounted on a downwardly-extending portion of a support member 6. The support member 6 is movable, back and forth along a substantially horizontal rail 7, using a slide system comprising pairs of grooved rollers 8 which are mounted on the support member 6 and which run along a knife edge 9 formed on the rail 7. (Such systems are widely available from Hepco Slide Systems Limited of Greenford, Middlesex, England). One end of the rail 7 is fixed to the lower end of a substantially vertical support bar 10 mounted for up and down movement, using a slide system similar to that referred to above and comprising pairs of rollers 11 as well as a knife edge 9 formed on the support bar 10.

The rollers 11 are mounted on a substantially vertical plate 12 supported by a substantially vertical post 13. The post 13 is mounted on a framework 14. Also mounted on the plate 12 are pneumatic piston and cylinder assemblies 15.

With reference to FIG. 5, each assembly 15 comprises a cylinder 60 housing a double-acting piston 61, a piston rod 16 attached to the piston 61, and upper and lower air inlet/exhaust lines 62, 63. Two-way valves 64, 65 connect lines 62, 63 with the alternatives of a pressure air supply pump 66 and atmosphere. The lower line 63 incorporates a variable restrictor 67.

If valve 65 is positioned to allow high pressure air to flow from the pump 66 to beneath the piston 61, and valve 64 is positioned to allow air from above the piston 61 to exhaust to atmosphere, the piston 61 is lifted relatively quickly.

On the other hand, if, as illustrated, valve 64 is positioned to allow high pressure air to flow from the pump 66 to above the piston 61, and valve 65 is positioned to allow air from beneath the piston 61 to exhaust to atmosphere, because the exhausting air has to pass through the variable restrictor 67, the piston 61 moves downwardly relatively slowly.

The valves 64, 65, which are motorised, are operated automatically, as required, by valve control means 68, employing signal lines 69a, 69b.

The piston and cylinder assemblies 15 thus provide actuating means operable whereby a separating member 4 is movable upwardly, relatively quickly and downwardly, relatively slowly.

Referring once again to FIGS. 1 and 2, the piston rod 16 of each unit carries, at its lower extremity, a disc 17.

On the upper end of each vertical support bar 10 is a finger 18 which extends over part of the upper surface of the associated disc 17 so that, upon retraction of the piston rod 16, the support bar 10 is raised correspondingly. This in turn causes the rail 7 fixed to the support bar 10 to be lifted and with it the support member 6 and the finger 5 mounted on the rail.

The finger support member 6, at its end opposite to that on which finger 5 is mounted, has a bifurcated portion forming a pair of laterally-spaced arms 19, positioned on opposite sides of the associated rail 7.

Mounted between the two biscuit supply channels 2, is an upright-disposed "T"-shaped member 20, which is movable substantially horizontally back and forth along between the channels 2 and above the rails 7. The member 20 has an upper limb 20a and a central support limb 20b. The arrangement is such that when a finger support member 6 is in its lowest position with its finger 5 acting as a stop, and the "T"-shaped member 20 is moved forward towards the plate 12, as indicated by arrow 52 of FIG. 2, the adjacent end of the upper limb 20a of the member 20 is positioned above the arms 19. If the rail 7 is now raised, using the associated unit 15, the arms 19 are brought into a position whereby they extend upwardly beyond the level of the upper limb 20a of the member 20. Thus, when the "T"-shaped member 20 is moved back, (in a direction opposite to arrow 52), its upper limb 20a is brought into contact with the arms 19, whereby the finger support member 6 is pulled rearwardly to the end of the rail 7, ready for the member 6 to commence a forward and downard biscuit-separating movement.

The above-mentioned valve control means 68 are used to move a piston rod 16 in an upward direction, so as to lift the associated vertical support bar 10 and separating member 4 attached thereto in a positive manner, whereby the upward movement of the member 4 is carried out relatively quickly. The accompanying upward movement of the finger 5 is substantially vertical. On the other hand, and as described above with reference to FIG. 5, means are provided whereby downward or return movement of the piston rod 16 is relatively slow. The associated support bar 10 is not directly attached to the piston rod 16, but as the piston rod 16 falls, it lowers the support bar 10 and finger 5 as it does so, due to contact between the finger 18 and disc 17. Downward movement of the finger 5 is substantially vertical. Should any resistance be offered against the downward movement of the support bar 10, associated rail 7 and finger support 6, by virtue of the finger 5 coming into contact with the top edge of a biscuit 1, then, as there is no positive connection between the support bar 10 and associated piston rod 16, the finger 5 is able to arrest this downward movement, until it finds its way from the top of the obstructing biscuit to between that biscuit and its immediate neighbour. (See FIG. 4). Thus the finger 5, which descends in a yielding, somewhat passive manner, is given time to enter the biscuit supply and avoid damaging biscuits, as biscuits would have been damaged if the finger had been positively driven.

It will be appreciated therefore from the foregoing, that only upward movement of the finger 5 takes place under the influence of a relatively major (or positive) actuating force, whereas downward movement of the finger 5 takes place under the influence of a relatively minor (or less positive) force, the relatively minor force in this example comprising gravity. Thus the separating member 4 is free (to pause in its downward movement if necessary) so as to make entry into the supply in a yieldable manner.

As there is no positive connection between the support bar 10 and associated piston rod 16, and as delay can occur between the continued downward movement of the disc 17 and interrupted downward movement of the finger 18, "lost-motion" means can be said to be provided. In this connection, a disc 17 and finger 18 can be viewed as first and second abutting or contacting members which engage positively during upward movement of the associated piston 61, but do not so engage during downward movement of the piston. A disc 17 and finger 18 also provide, together with restrictor 67, means for controlling the speed of downward movement of a separating member 4.

The finger support member 6 of each device 51 is freely mounted on a rail 7. Forward movement of the member 6, i.e. in the direction of arrow 52 (FIG. 2), is brought about by contact between the finger 5 and biscuits 1 being conveyed along the associated channel 2. As shown in FIG. 2, each channel 2 is mounted on a series of vibratory members 21. Furthermore, the channel 2 is inclined slightly downwards in the direction of conveyance and this, together with the vibration applied to the channels, supplies the conveying force for the biscuit supply. Thus, when the downwardly-extending finger 5 of the member 6 first comes into contact with, and then, as shown in FIG. 4, is "trapped" in biscuits 1 being conveyed along the channel 2, the member 6 is moved along with the biscuits.

With reference once more to FIG. 2, the cycle of operation of the apparatus 50, starting from where the finger 5 of the nearside device 51 is in its lowermost stop position, at the outlet end of the associated channel 2, is as follows:

The farside piston rod 16 is moved downwardly, at a restricted speed, (as explained above, with reference to FIG. 5), allowing the associated support bar 10, rail 7 and support member 6 to fall under the force of gravity, during which fall the arms 19 clear the upper limb 20a of the "T"-shaped member 20. As the finger 5 comes into yieldable contact with the moving supply of biscuits 1, it is moved forward with them, gradually finding an entry point between two immediately adjacent biscuits, as illustrated in FIG. 4, where the member 6 is shown approaching the half distance of its forward path of travel along rail 7, and the finger 5 is not yet fully in position. By the time the member 6 completes its forward travel, the support bar 10 has completed its downward movement, and the finger 5 is in its lowermost, fully separating position, at the outlet of farside channel 2. While the farside piston rod is being operated as above, the "T"-shaped member 20 is moved forwardly, in the direction of arrow 52, by controlled actuating means comprising a pneumatic piston and cylinder unit (not shown), until the upper limb 20a of the member 20 is disposed above the nearside support member 6 and wall beyond the arms 19 thereof. With the chute 3 now in position at the outlet end of the nearside channel 2, the nearside pneumatic assembly 15 is operated so as to cause its rod 16 to retract, on a relatively quick stroke, lifting the support bar 10 together with associated rail 7 and finger support member 6, thus allowing the biscuit supply to advance into the chute 3. In this lifted position of the nearside support member 6, the arms 19 thereof now extend upwardly, into the return path of the upper limb 20a of the member 20. The "T"-shaped member 20 is then removed back (in a direction opposite to arrow 52), pulling the support member 6 along with it to almost the full length of the rail 7, which is the position shown in FIG. 3. The support member 6 can be held in this raised position until it is time for the next separating sequence.

Figure 3:
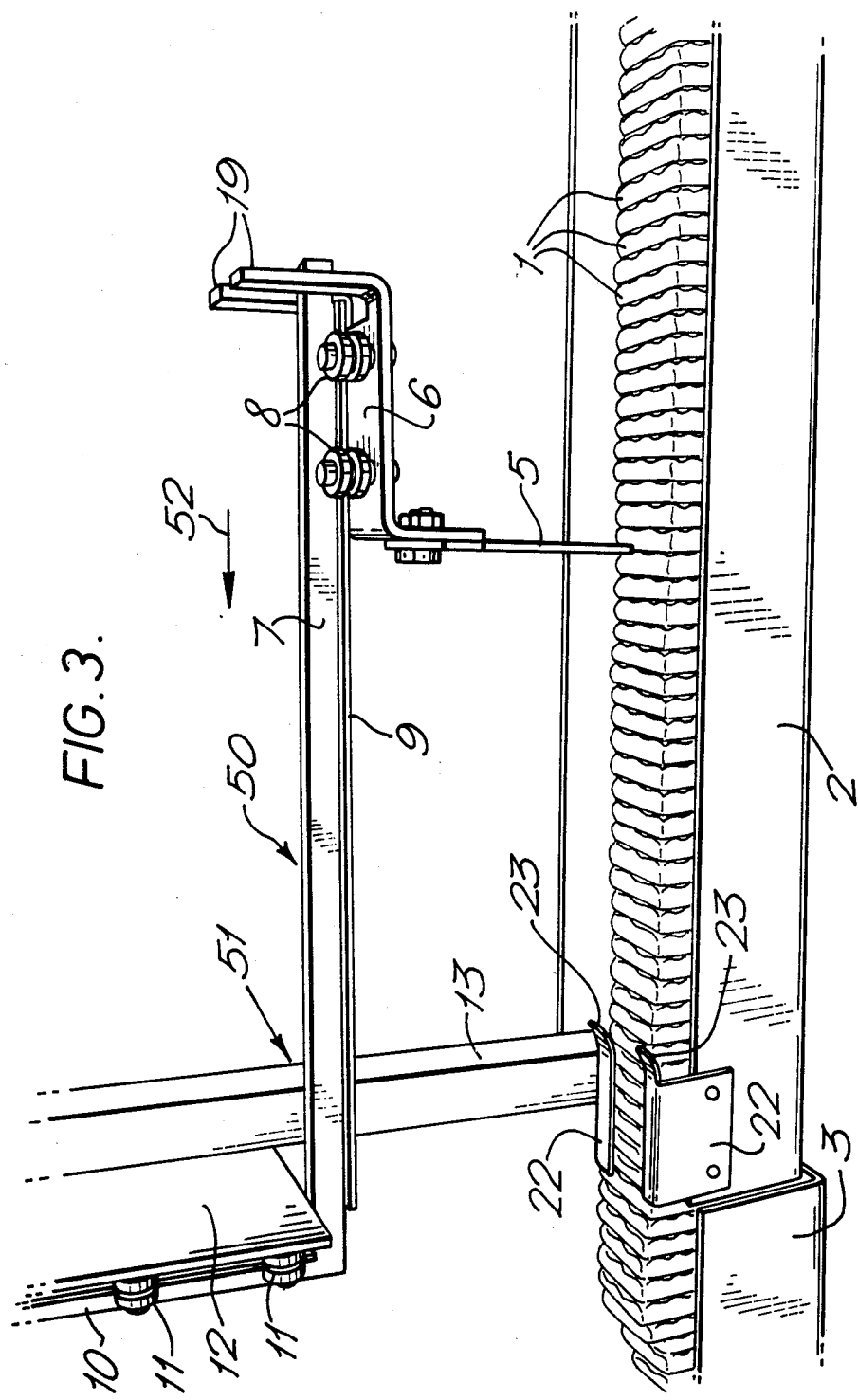
FIG. 3 is also a view from the side and above, of the devices, but from a different angle, and illustrates the separating member of the nearest device in position above the supply of biscuits and ready to start its forward and downward biscuit-separating movement.

The vibration imparted to the biscuits 1 by the units 21 assists in the finding of an entry point by a finger 5, and it further assists if the vibratory movement of the section of channel 2 below the path of travel of the falling finger 5, is given an intermittent motion, such as a series of bursts of vibration. Should a finger 5 contact the top edge of a biscuit, it is not long before it finds its way from the top edge of the biscuit down one side thereof, assisted by the vibration. If the downward movement of the finger 5 is arrested momentarily, for example, through such contact with the top edge of a biscuit, the relatively slow rate of descent of piston rod 16 ensures that when finger 5 is free to move downwardly again, its fall is limited, as the associated finger 18 on its vertical support bar 10 will eventually come into contact with the disc 17 on the piston rod 16, which, due to its slow downward stroke, will not have moved very far ahead. When the separating member 6 is lifted by a relatively quick upward stroke of the piston rod 16, there may be a tendency for the biscuits 1 immediately adjacent the finger 5 to lift with the finger. With reference to FIG. 3, to overcome this problem, biscuit-restraining members 22 are provided, affixed to opposite sides of a channel 2 at the outlet end thereof. Sufficient space is left for free passage of the finger 5 between the two restraining members 22, the rearward edges of which have turned up, lead-in faces 23 to cater for any biscuit slightly displaced from the horizontal.

While a separating device 51 has been described as being used with two lanes of biscuits, it can, of course, be used in connection with a greater number of lanes.

With reference to FIG. 6, in the case of the modified apparatus 50a illustrated thereby, the "T"-shaped member 20 (FIG. 2) is replaced by two pneumatic piston and cylinder assemblies 70 mounted one on each side of the channels 2, of whatever number of lanes are being used, and a bar 71 which extends between the piston rods 72 of the two assemblies 70. The single bar 71 corresponds to the limb 20a of a member 20 (FIG. 2) and is used to draw each forwardly disposed support member 6a back (in a direction opposite to arrow 52), by engagement therewith. Support members 6a are of substantially the same form as members 6 of FIG. 2, except that the support members 6a each have only one arm 19.

The invention may also be used for batching biscuits for the purpose of obtaining slugs thereof for feeding to a biscuit-wrapping machine.

In this application a separating member 4 may, or may not be movable above and along the path of the advancing supply, depending on requirements. Hence support member 6, rail 7 and "T"-shaped member 20 are not required.

However, a light spring, or other means, may be employed to assist gravity in downward movement of a support bar 10, while taking care to make sure that the separating member 4 continues to enter the advanced supply of biscuits in a yielding manner.

In this application of the invention, the biscuit supply is conveyed to a stop member. This may comprise a finger movable towards and away from the biscuits from below. The separating member 4 is then caused to enter the supply at a predetermined point spaced from and rearwardly of the stop member. The supply is then held back while the slug is taken away to an infeed pocket of a wrapping conveyor.

The slug size may be chosen by counting a predetermined number of biscuits or by selecting a predetermined length of biscuit supply. After sensing the count or length, the separating member 4 is caused to enter the supply so as to isolate the slug, plus or minus one biscuit, to allow for the separating member 4 contacting the top of a biscuit, and then making entry either side of that biscuit.

After removal of the slug, the separating member 4 and stop member are withdrawn, to allow the process to be repeated.

The invention can be utilized wherever the separation of upright adjacent articles, as they are being conveyed, is required, and while it has been described in connection with separating biscuits, it is not limited to such use, although by its gentle operation it has been found particularly ideal for use with fragile laminar articles such as biscuits, in that it overcomes the breakage problems that have plagued the automatic biscuit handling art for so long.

I claim:

1. A device for separating and holding back an advanced supply of contiguous laminar articles arranged in upright relationship, comprising:
   a conveyor means for advancing a supply of contiguous laminar articles;
   an upright-disposed separating member;
   first means enabling sequential movement of the separating member;
   (a) downwardly from an original position towards the advanced supply of articles;
   (b) into the advanced supply between two adjacent articles and forwardly together with said supply;
   (c) upwardly away from the advanced supply; and,
   (d) rearwardly to the original position;
   second means enabling only the upward movement of the separating member to take place as positive motion, whereas downward movement of the separating member is such that the separating member is free to make entry into the supply in a yieldable manner, said second means incorporating lost-motion means and comprising a fluid-operated, double-acting piston movable within a cylinder; and,
   means for restricting outward flow of fluid from the cylinder on one stroke thereof to control the speed of downward movement of the separating member, whereby the articles are not damaged by the separating member.

2. A device as claimed in claim 1, wherein the lost-motion means comprises first and second abutting members, whereby the first and second latching members engage positively during upward movement of the separating member but do not so engage during downward movement of the separating member.

3. A device as claimed in claim 1, wherein the separating member remains upright-disposed throughout the sequential movement thereof.

4. A device for separating and holding back an advanced supply of contiguous laminar articles arranged in upright relationship, comprising:
   a conveyor means for advancing a supply of contiguous laminar articles;
   a separating member movable downwardly towards and upwardly away from the path of the advanced supply;
   actuating means whereby, in operation, only upward movement of the separating member takes place as positive motion, whereas the downward movement of the separating member is such that the separating member is free to make entry into the supply in a yieldable manner, said actuating means incorporating lost-motion means and comprising a fluid-operated, double-acting piston movable within a cylinder; and,
   means for restricting outward flow of fluid from the cylinder on one stroke thereof to control the speed of downward movement of the separating member.

5. A device as claimed in claim 4, wherein the lost-motion means comprises a first abutting member carried by and movable with the piston, and a second abutting member carried by and movable with the separating member, whereby the first and second abutting members engage positively during upward movement of the piston but do not so engage during downward movement of the piston.

6. A device for separating and holding back an advanced supply of contiguous laminar articles arranged in upright relationship, comprising:
   a conveyor means for advancing a supply of contiguous laminar articles;
   a separating member movable downwardly towards and upwardly away from the path of the advanced supply;
   actuating means incorporating lost-motion means and comprising a fluid-operated, double-acting piston movable within a cylinder whereby, in operation, only upward movement of the separating member takes place as positive motion, whereas the downward movement of the separating member is such that the separating member is free to make entry into the supply in a yieldable manner, the lost-motion means comprising first and second abutting members, whereby the first and second abutting members engage positively during upward movement of the separating member but do not so engage during downward movement of the separating member; and,
   means for controlling the speed of downward movement of the separating member, whereby the articles are not damaged by the separating member.

7. A device as claimed in claim 6, wherein the means for controlling the speed of downward movement of the separating member comprises means for restricting outward flow of fluid from the cylinder on one stroke thereof.

8. A device as claimed in claim 1, wherein the downward movement of the separating member takes place only under the influence of gravity.

9. A device as claimed in claim 1, further comprising actuating means in the second means operable to move the separating member upwardly relatively quickly and downwardly relatively slowly.

* * * * *